United States Patent Office 3,501,354
Patented Mar. 17, 1970

3,501,354
ALKALI METAL ALUMINATE BONDED WELDING FLUX AND MANUFACTURE THEREOF AND COATED WELDING ELECTRODE
William T. De Long, West Manchester Township, York County, Pa., assignor to The McKay Company, Pittsburgh, Pa., a corporation of Pennsylvania
No Drawing. Filed Feb. 19, 1968, Ser. No. 706,681
Int. Cl. C23c 1/08
U.S. Cl. 148—23                                3 Claims

ABSTRACT OF THE DISCLOSURE

An alkali metal aluminate bonded welding flux usable as a flux in submerged arc welding or as an electrode core wire flux coating comprising finely divided flux material and a binding agent comprising alkali metal aluminate (one or both of sodium aluminate and potassium aluminate) in an amount of from 1 to 7.5%, preferably 1.5 to 5%, of the weight of the finely divided flux material, both calculated on a water-free basis. The alkali metal aluminate may have a molecular ratio of alkali metal oxide to aluminum oxide between .9 and 1.4 and preferably about 1.1. In making the flux the alkali metal aluminate may be mixed with water to form a uniform liquid whereafter the uniform liquid may be added to and mixed with the finely divided flux material and the mixture dehydrated.

---

This invention relates to an alkali metal aluminate bonded welding flux, a method of making such a flux, a flux coated welding electrode and a submerged arc flux.

Bonded fluxes appropriate to the welding use are compounded from powdered flux materials such as minerals, oxides, salts and metals either for application to a welding electrode or for agglomeration and use along with the electrode in the submerged arc process.

For over fifty years the alkali metal silicates have been without serious competition as binding agents for the flux coatings applied to welding electrodes of the ferrous, nickel and nickel-base and copper and copper-base types. More recently they have served as the chief binding agents for agglomerated submerged arc fluxes. Not without attractions, these silicate binders are convenient to use and store. They produce strong, durable electrode coatings capable of withstanding normal shipping and use without damage and control welding behavior due to the well defined and stable cup formed by the coating on the arc end of the electrode during welding. However, investigators in welding have long been interested in having some practical alternative to the alkali metal silicates to work with to study what new effects might be secured in slag behavior and metallurgical results without the contribution of silica which is always made by silicate binders and without some unacceptable contribution made by the alternative binder.

Organic base binders have occasionaly been resorted to for electrode flux coatings, primarily in coatings for nickel-base electrodes, but serious disadvantages accompany their use. The resulting flux coatings are generally fragile, tend to flake away from the core wire in the arc area, and do not produce a stable and well defined cup at the electrode end to enclose and define the arc. Moreover, the organic binders are sources of hydrogen, which is detrimental to virtually all metals and metal alloy systems deposited by welding.

Alkali metal aluminates have been used as binders or binder supplements in such products as cement paints, and while proposed for use as binding agents for the flux coatings of arc welding electrodes have brought so many problems that they have never been commercially employed so far as I am aware. Prior to my invention aluminate binders could not be considered practical or commercial.

The alkali metal aluminates appear on the market as powered solids and the methods employed by the prior art to develop their adhesive binding qualities in flux mixes were impractically slow and tedious. Mixing times of 1½– 2½ hours were commonly required using standard flux mixers to which flux materials, aluminate and water were added at the start. Such excessively long mixing times often overheated the batch and produced reactions between the binder and the flux materials, injuring both. Undoubtedly influenced by the fabrication methods developed by the prior art for handling alkali metal aluminate, previous flux compositions have typically contained from one to four times as much residual binder as a flux made with an alkali metal silicate. While such binder has the merit that it introduces no silica, the large quantity of the less soluble alumina dominates the flux by requiring commensurate quantities of compatible flux materials and greatly restricts the freedom of flux formulation. Neither do such aluminate binder levels offer any real improvement over silicate binders in final moisture level of the flux since the large amount of aluminate compensates for its somewhat lower baked-out moisture content and its rehydration rate is actually much higher. The value of reaching and holding low moisture contents in welding fluxes is well known and therefore to help control moisture pick-up the prior art has required that the flux contain additions of reactive oxides such as titania, alumina or zirconia to combine with alkali in the binder exceeding the alkali-alumina molecular ratio of one. These arbitrary additions further restricted the composition of the flux whose real purpose was to handle the metallurgical problems of welding and not to be compatible with its binder.

In contrast to previous methods of using alkali metal aluminates as flux binding agents which compounded their disadvantages and prevented the realization of their potential, I have found that great advantages follow from my new procedure whereby I mix the aluminate with water to form a uniform liquid which is then added to and mixed with the remaining dry flux materials. I have found that a common electric mixer or preferably one of the high speed blender type can be used to rapidly disperse the aluminate in water to form a usable binder mixture which may be partly true solution and partly colloidal in character. By following this procedure I am able to rapidly develop the adhesive qualities of the binder in the flux mixture in a normal mixing time of about thirty minutes. At the same time I am able to accomplish binding action with unprecedentedly small amounts of the aluminate. Since my improved methods of fabricating fluxes with alkali metal aluminate binders restores the mixing time to a normal range of both time and flux temperature, heat induced chemical reaction between flux materials and aluminate is no longer a problem.

One aluminate which I have found useful in the practice of my invention is a commercial low priced white granular sodium aluminate trihydrate, water soluble, containing about 40% $Al_2O_3$, 31% $Na_2O$, 23% water and minor impurities. The $Na_2O$ to $Al_2O_3$ molecular ratio of this aluminate is about 1.1 and it readily forms a uniform liquid when mixed with water whereas prior art fluxes had an alkali metal aluminate binder content of from 10 to over 40%. I have discovered that with my improved procedure entirely satisfactory binding action can be secured with unprecedentedly small amounts of alkali metal aluminate. I am able to use as little as one tenth the previous amounts and it goes without saying that the disadvantages of the binder are reduced at the same time to one tenth their previous size. Thus the deficiencies particularly with regard to water retention and pickup by the flux are cured for all practical purposes without the use of reactive oxides. The use of low levels of aluminate binders prepared and employed as described results in very satisfactory flux hardness and toughness and overcomes all the disadvantages which have prevented the commercialization of aluminate binders for welding flux use.

The use of alkali metal aluminate binder as herein disclosed has been found to provide a flux with moisture content and rehydration rate far less than previous aluminate bonded fluxes and equal to or lower than that normally present with commercial silicate bonded fluxes when both are given high temperature bakes in the area of 750° F. Furthermore, the use of alkali metal aluminate binders as herein disclosed permits dispensing with the required use of auxiliary oxides of aluminum, titanium or zirconium since their function is no longer of importance. Release from this restriction increases the freedom of flux formulation.

One binder composition which I have found useful is:

Water—100 cc.
Sodium aluminate—30 grams
Sodium chromate—.3 gram

This material is blender mixed for a few minutes until a uniform liquid is obtained. It may then, for example, be added to and mixed with the dry ingredients of an electrode flux coating formulation to form a paste satisfactory for extrusion on to a core wire. As shown in this example, I may add some rust inhibitor such as sodium chromate to the liquid mixture to minimize corrosive attack on the processing equipment or metal powders in the flux mixture and I may also add some organic material such as sodium carboxymethylcellulose (sodium CMC) to thicken the binder. Both such additions are well understood by those skilled in the art and form no part of my invention. In the binder liquid I may also adjust the total alkali content and the ratio between alkalies by the addition of alkali hydroxides or carbonates as is often done with alkali metal silicate binders.

I provide an improved alkali metal aluminate bonded flux for electric welding use which employs unusually small quantities of an aluminate having an alkali metal oxide to alumina molecular ratio between .9 to 1.4 and preferably about 1.1. Either sodium aluminate or potassium aluminate may be used and, after drying and baking, on a water-free basis my improved flux contains only 1–7.5% (preferably 1.5 to 5%) sodium aluminate. About 15% higher by weight of potassium aluminate is molecularly equivalent but this small factor may usually be ignored.

The following listed selected dry ingredients may typically be used in the amounts stated in one coated electrode embodiment of my invention:

| | Grams |
|---|---|
| Calcium carbonate | 30 |
| Calcium fluoride | 27 |
| Ferrosilicon | 6.7 |
| Silica | 6 |
| Nickel | 4 |
| Ferromolybdenum | 1 |
| Ferrochromium | 1 |
| Iron | 21.7 |
| Manganese | 2 |
| Sodium CMC | .6 |
| | 100.0 |

About 12 cc. of the previously described binder is typically required with this quantity of dry material to form an extrudable mass. This binder level provides about 3.14 grams of the 23% water sodium aluminate or 2.42 grams on a water-free basis for the 100 grams of dry materials. The flux therefore contains about 2.38% by weight aluminate on a water-free basis. Because of the low aluminate level 97.62% of the flux composition is open to freedom of formulation, only 1.26% $Al_2O_3$ is added to the welding flux which presents no difficulty and the total water content introduced by the dried aluminate binder is only one fourth to one tenth that brought by previous aluminate flux usages.

An important advantage of the use of aluminate binders according to my invention is that now for the first time the moisture content and rehydration rate of the flux is equal to or less than that produced by typical conventional silicate binders, based on the actual binder level required in each case. To compare water content and rehydration rate between two baked binder films a typical silicate binder and an aluminate binder according to my invention were prepared. The compositions of the binders were:

| | Parts | |
|---|---|---|
| | Silicate binder | Aluminate binder |
| Water | 57.11 | 83.73 |
| $SiO_2$ | 28.09 | |
| $Al_2O_3$ | | 9.12 |
| $Na_2O$ | 6.43 | 6.13 |
| $K_2O$ | 8.37 | |
| Sodium chromate | | .24 |
| Sodium CMC | | .78 |
| | 100.00 | 100.00 |

In each case the ingredients of the binder were thoroughly mixed together, allowed to dry slowly at temperatures below 200° F. and then baked for two hours at 800° F. The baked binder films were crushed to —20 U.S. mesh particles and measured for moisture content by the navy water test (fusion in a stream of oxygen at 1800° F.) and for rehydration by an accelerated test of 24 hours at room temperature in an 88% relative humidity atmosphere. The moisture contents in the two situations were as follows:

| | Silicate film | Aluminate film |
|---|---|---|
| Percent moisture by fusion | 1.78 | 1.18 |
| Percent rehydration | 5.46 | 17.40 |

Based upon the volume of binder required in each case for typical fluxes and the moisture properties of the dried films the data for the two fluxes becomes as follows:

| | Silicate flux | Aluminate flux |
|---|---|---|
| C.c. binder/100 parts finished flux | 12.1 | 11.5 |
| Grams binder/100 parts finished flux | 7.6 | 2.36 |
| Percent moisture in flux | .135 | .028 |
| Percent rehydration | .42 | .41 |

These tests show that in the fight against moisture typical fluxes made according to my invention and baked at 800° F. contain less than one fourth the moisture of prior art fluxes bonded either with silicate or aluminate. With respect to rehydration my alkali metal aluminate bonded fluxes are about equal to silicate fluxes but at least four times better than previous aluminate fluxes.

While the preferred embodiments of my invention contain sodium aluminate, the principles apply equally to potassium aluminate and to mixtures of sodium and potassium aluminate which may be used.

Also, while I have described electrodes flux coated by extrusion the principles apply equally to electrodes flux coated by dipping in which the final aluminate in the dry form in the coating is equal to that herein disclosed.

The principles also apply to agglomerated submerged-arc fluxes which reach the welding zone by being spread on the base material and which may use even smaller binder contents than fluxes which are intended for application to metal electrodes.

An agglomerated flux of the same chemical composition previously recommended elsewhere for use in the fused flux form was prepared using the same binder employed in the extruded electrode flux coating of the first example, 15.2 cc. of this aluminate binder were added to 100 g. of the dry flux composition and the mixture dehydrated and granulated. The final flux had the following recommended analysis:

| | Percent |
|---|---|
| $SiO_2$ | 19.9 |
| $TiO_2$ | 5.0 |
| $Al_2O_3$ | 10.9 |
| CaO | 20.3 |
| MgO | 12.1 |
| MnO | 7.2 |
| $K_2O$ | .4 |
| $Na_2O$ | 2.3 |
| $CaF_2$ | 20.0 |

This agglomerated flux made simply with a binder and without the advantages of fusing when coupled with a 7/64 inch conventional low alloy tubular electrode in the submerged arc process produced sound porosity free welding results at 380 amperes and 27 volts DC.

Properly formulated fluxes made in accordance with my invention are normal in welding operation and usually are not recognized by welders as being strange or different from the silicate bound products which up to this point are the only ones they have ever seen.

While I have described certain present preferred embodiments of the invention and certain present preferred methods of practicing the same, it is to be distinctly understood that the invention is not limited thereto but may be otherwise variously embodied and practiced within the scope of the following claims.

I claim:
1. An alkali metal aluminate bonded welding flux comprising finely divided flux material and a binding agent comprising alkali metal aluminate in an amount of from 1.5 to 5% of the weight of the finely divided flux material, both calculated on a water-free basis, the alkali metal aluminate being at least one of the class consisting of sodium aluminate and potassium aluminate, the alkali metal aluminate having a molecular ratio of alkali metal oxide to aluminum oxide of about 1.1.

2. An alkali metal aluminate bonded welding flux as claimed in claim 1 in which the alkali metal oxide comprises both sodium oxide and potassium oxide.

3. An alkali metal aluminate bonded welding flux comprising finely divided flux material and a binding agent comprising sodium aluminate in an amount of about 2.4% of the weight of the finely divided flux material, both calculated on a water-free basis, the sodium aluminate having a molecular ratio of alkali metal oxide to aluminum oxide of about 1.1.

References Cited

UNITED STATES PATENTS

| 2,547,432 | 4/1951 | Andrews | 148—26 |
| 3,152,019 | 10/1964 | Shrubsall | 148—26 |
| 3,211,582 | 10/1965 | Wasserman et al. | 148—26 |

HYLAND BIZOT, Primary Examiner

T. R. FRYE, Assistant Examiner

U.S. Cl. X.R.

29—495; 148—26